(12) United States Patent
Nichols et al.

(10) Patent No.: US 7,430,003 B2
(45) Date of Patent: Sep. 30, 2008

(54) DIGITAL CAMERA/COMPUTER SYNCHRONIZATION METHOD

(75) Inventors: James Franklin Nichols, New York, NY (US); Kenneth Edward Nichols, Gaithersburg, MD (US)

(73) Assignee: Candid Color Systems, Inc., Oklahoma City, OK (US)

( * ) Notice: Subject to any disclaimer, the term of this patent is extended or adjusted under 35 U.S.C. 154(b) by 535 days.

(21) Appl. No.: 10/376,146

(22) Filed: Feb. 28, 2003

(65) Prior Publication Data

US 2004/0036774 A1   Feb. 26, 2004

Related U.S. Application Data

(60) Provisional application No. 60/405,758, filed on Aug. 23, 2002.

(51) Int. Cl.
*H04N 5/76* (2006.01)
*H04N 5/222* (2006.01)

(52) U.S. Cl. .................. 348/231.3; 348/231.5; 348/371

(58) Field of Classification Search .............. 348/231.5, 348/371, 231.6, 231.3, 207.1, 207.99, 370, 348/373, 376; 396/155
See application file for complete search history.

(56) References Cited

U.S. PATENT DOCUMENTS

| | | | |
|---|---|---|---|
| 4,465,926 A | 8/1984 | Apitz et al. | |
| 4,805,037 A * | 2/1989 | Noble et al. ................ | 386/119 |
| 5,136,646 A | 8/1992 | Haber et al. | |
| 5,321,396 A | 6/1994 | Lamming et al. | |
| 5,408,080 A | 4/1995 | Zazzu et al. | |
| 6,031,963 A | 2/2000 | Kitamura et al. | |
| 6,335,742 B1 | 1/2002 | Takemoto | |
| 6,499,892 B2 | 12/2002 | Beggiao | |
| 6,608,563 B2 * | 8/2003 | Weston et al. ............ | 340/573.1 |
| 6,646,754 B1 | 11/2003 | Redd et al. | |
| 6,747,690 B2 * | 6/2004 | Mølgaard ................ | 348/208.1 |
| 6,845,913 B2 | 1/2005 | Madding et al. | |
| 6,914,626 B2 * | 7/2005 | Squibbs ................... | 348/231.3 |
| 6,928,230 B2 * | 8/2005 | Squibbs ....................... | 386/46 |
| 6,985,875 B1 * | 1/2006 | Wolf ........................... | 705/26 |
| 7,016,532 B2 | 3/2006 | Boncyk et al. | |
| 7,047,214 B2 | 5/2006 | Wolf | |
| 7,093,762 B2 | 8/2006 | Silverbrook et al. | |
| 7,133,740 B1 | 11/2006 | Stenson et al. | |
| 2002/0097333 A1 * | 7/2002 | Wechsler et al. ............ | 348/373 |
| 2002/0101519 A1 * | 8/2002 | Myers ........................ | 348/232 |
| 2003/0164978 A1 | 9/2003 | Song | |
| 2004/0070678 A1 * | 4/2004 | Toyama et al. ........... | 348/231.3 |
| 2004/0119831 A1 | 6/2004 | Miyawaki | |

(Continued)

*Primary Examiner*—Nhan T Tran
*Assistant Examiner*—Richard M Bemben
(74) *Attorney, Agent, or Firm*—McAfee & Taft (57) ABSTRACT

A method for matching a photographic image with related identifying data, including the steps of creating a digital image that includes a datafile containing image time data, generating a signal when the digital image is created, and storing in a digital storage device identifying information relevant to the digital image. The identifying information also has information time data associated therewith. A signal is transmitted to the digital storage device and a time stamp is applied to the signal at the digital storage device. The image time data is stored in the digital storage device in time sequenced order. The image time data and the information time data are synchronized, and the digital image is associated with the identifying information by matching the synchronized image time data and the information time data.

23 Claims, 4 Drawing Sheets

U.S. PATENT DOCUMENTS

| | | |
|---|---|---|
| 2004/0135902 A1 | 7/2004 | Steensma |
| 2004/0189807 A1 | 9/2004 | Smith |
| 2005/0038794 A1 | 2/2005 | Piersol |
| 2005/0093999 A1 | 5/2005 | Yamaya |
| 2005/0286805 A1 | 12/2005 | Yoshida |
| 2006/0085477 A1 | 4/2006 | Phillips et al. |
| 2006/0203312 A1 | 9/2006 | Van de Sluis et al. |

* cited by examiner

DIGITAL CAMERA/COMPUTER SYNCHRONIZATION METHOD

TECHNICAL FIELD AND BACKGROUND OF THE INVENTION

This invention relates to a combination of hardware and software that creates an interface apparatus and system between digital cameras and a digital device such as a computer or various types of personal digital assistants ("PDA's"), such as Compaq iPAQs, Palm Pilots, and similar devices. In addition, the term "PDA" as used herein also includes cell phones and other digital devices with the capability to record and analyze the data, and upload the data and/or image files via radio transmission.

The interface apparatus senses that a photo has been taken, either by watching for a flash from the camera or by being connected to the camera's external flash connector. When a photo is taken, a signal is sent to the computer or PDA, where the event is recorded. The event can be recorded both in sequential order and with a time and date stamp. Barcode or other customer-specific data is then entered into the PDA, and this information can then be used to provide an accurate sequencing of events occurring at a photo shoot.

The purpose of synchronizing the digital camera with the PDA is to enable the event photographer to match customer data with individual photographs. In the past, event photographers have had to keep some kind of a logsheet, either on paper or by using a tape recorder or other device, in order to know which photograph belongs to what subjects/customers.

The alternative to keeping a logsheet at the shoot (which often requires one assistant per photographer) has been to make proofs of all of the photographs taken at the event when film has been used, or when digital cameras are utilized, to put all of the photographs on a website and require the participants and potential customers to look through all of the photos to locate their own. These approaches work for small events, especially those where the participants know each other and enjoy seeing all the photographs (sorority parties, weddings, etc.), but are impractical for large events where several hundred photographs are taken.

During the "dot com" boom, several companies raised tens of millions of dollars from investors who believed that an opportunity was created by placing event photos online for customers to view and purchase from a website created for each event. The assumption was that the opportunity to merge digital photography and internet marketing would create a new "niche" within the event photography industry. All of these companies failed, both because of the disappearance of funding for dot coms, and because their business model required the customer to remember to come look for their photos after the event and to page through hundreds of photos to find their own.

Although this novel apparatus and system has applications for other types of photography, such as studio portraiture where collecting and matching customer data is needed, one of the initial or primary uses at this time is for event photography. Although there is no specific delineation of what event photography encompasses, in general this category includes amusement parks (pictures taken at various locations within the park-not on the rides themselves), cruise ship photography, parties (proms, dances, fraternity/sorority events, reunions, concerts, etc.), resorts, and other places where roaming photographers take photographs of the participants.

Photographs at these types of events are sometimes taken at fixed locations (photo booths) and presold at the time of photography, such as Santa photos at shopping malls. However, the most common approach at these types of events is "speculation photography" in which the photographer takes a photo of a subject and markets it to the subject afterwards in the hope that the subject will purchase it. For fixed photo booth operations, several companies have developed systems that interface digital cameras with laptop or desktop computers, and if desired the photos can be printed immediately on location. However, these systems are not portable enough for use by roving photographers due to power, size, and weight requirements of the equipment.

As laptop computers and PDA's have become more prevalent, powerful, and smaller, there has been interest in interfacing the event photographer's camera with a wearable computer. Digital cameras make this possible because the image datafile is created when the photo is taken. Linking the photograph to customer information (name, package ordered, email address, etc.) makes it possible to market speculation photos. This can create photo revenue opportunities from concerts, amusement parks, etc. via a website. In addition, there are additional scenarios in which creating a link between photos and customer data can be used to identify, sequence, and produce prepurchased photos from Little League and other youth sports photos without keeping a manual logsheet or requiring the participants to look through hundreds of proofs to locate their own photos.

One company has developed a wearable computer in which the photos are downloaded to a small computer worn by the photographer. This approach is different from the present system in which a synchronization is created between the computer and the PDA device, and the photos themselves are not downloaded into the computer worn by the photographer. The approach of downloading photos to a small computer worn by the photographer has several disadvantages:

1) The computer and accompanying batteries are too heavy to be worn for very long, especially by amusement park and cruise ship photographers working outside on hot days;

2) There is a significant delay while each photograph is downloaded via firewire or USB to the computer worn by the photographer. This delay reduces the number of photographs that can be taken at many events;

3) The system is camera-specific and must be adapted to specific cameras one at a time. In contrast, the system disclosed in this application will work with virtually any digital camera; and 4) A complete system is very expensive—$3,000 or more vs. $800-$900 (or less) for the system disclosed herein.

Other companies may be offering a similar approach to the one described in the above paragraph, as many of the current models of professional digital cameras have some type of interface built in that can be mated to a computer. These approaches are different than the present system, and would have the same drawbacks and force the photographer to only use cameras that have had a unique interface developed for them. This is a significant problem in an industry where there are so many different brands of cameras that are being replaced with new models every year.

No prior approach transmits data to a PDA indicating that a photo was taken, and then thereafter uses software to match the photos to the customer data collected on the PDA. This approach has the advantage of being faster (no wait time required to download images to the PDA), less expensive, and can be applied to virtually any digital camera without requiring software or camera-specific adaptations.

Some prior art systems attempt to synchronize a photograph and associated data in various ways. For example, the OzE system requires that the photographer take a "synch shot" that indexes the camera's timestamp (embedded in the .jpeg image file) and the timestamp recorded by the barcode reader and later downloaded to a host computer. This is accomplished by having the photographer press the shutter button on the camera at the same time, or as nearly as possible, to the same time as the barcode wand is activated. This is believed to be done by "wanding" a special or beginning card.

This approach is open to human error, and the "match" between the firing of the shutter on the camera and the barcode read could be thrown off by too much a delay between the two actions, or an overlooked misread on the barcode wand. In many events this potential gap between the two actions would not cause a problem, but if a photographer then photographed a very fast event, such as a school graduation with people crossing the stage every 2 or 3 seconds, this variance in timing could cause some people to receive the wrong photos.

SUMMARY OF THE INVENTION

Therefore, it is an object of the invention to provide an apparatus that creates an interface apparatus and system between digital cameras and computers or personal digital assistants ("PDA's").

It is another object of the invention to provide an apparatus that utilizes the flash circuit of a digital camera to trigger a signal identifying the photograph which is sent to the computer or PDA.

It is another object of the invention to provide an apparatus that works in either a condition where the camera and the computer or PDA are tethered or untethered.

It is another object of the invention to provide an apparatus that utilizes the flash circuit of a digital camera to trigger a signal identifying the photograph which is sent to the computer or PDA, wherein the time and date coding of the camera and computer or PDA are synchronized.

It is another object of the invention to provide an apparatus that utilizes the flash circuit of a digital camera to trigger a signal identifying the photograph which is sent to the computer or PDA, whereby a consumer can use data from the computer or PDA to access and view photographs on, for example, a website or at a self-service viewing location such as a kiosk.

It is another object of the invention to provide a method of utilizing the flash circuit of a digital camera to trigger a signal identifying the photograph which is sent to the computer or PDA.

It is another object of the invention to provide hardware to perform synchronization between a digital camera and a computer or PDA by synchronizing the camera to a scanner-type barcode reader by either reading and measuring the difference between the clocks on the camera and barcode reader, or by resetting the clocks on both devices to match the host computer's time clock.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Camera/PDA Synchronization

Figure 1:
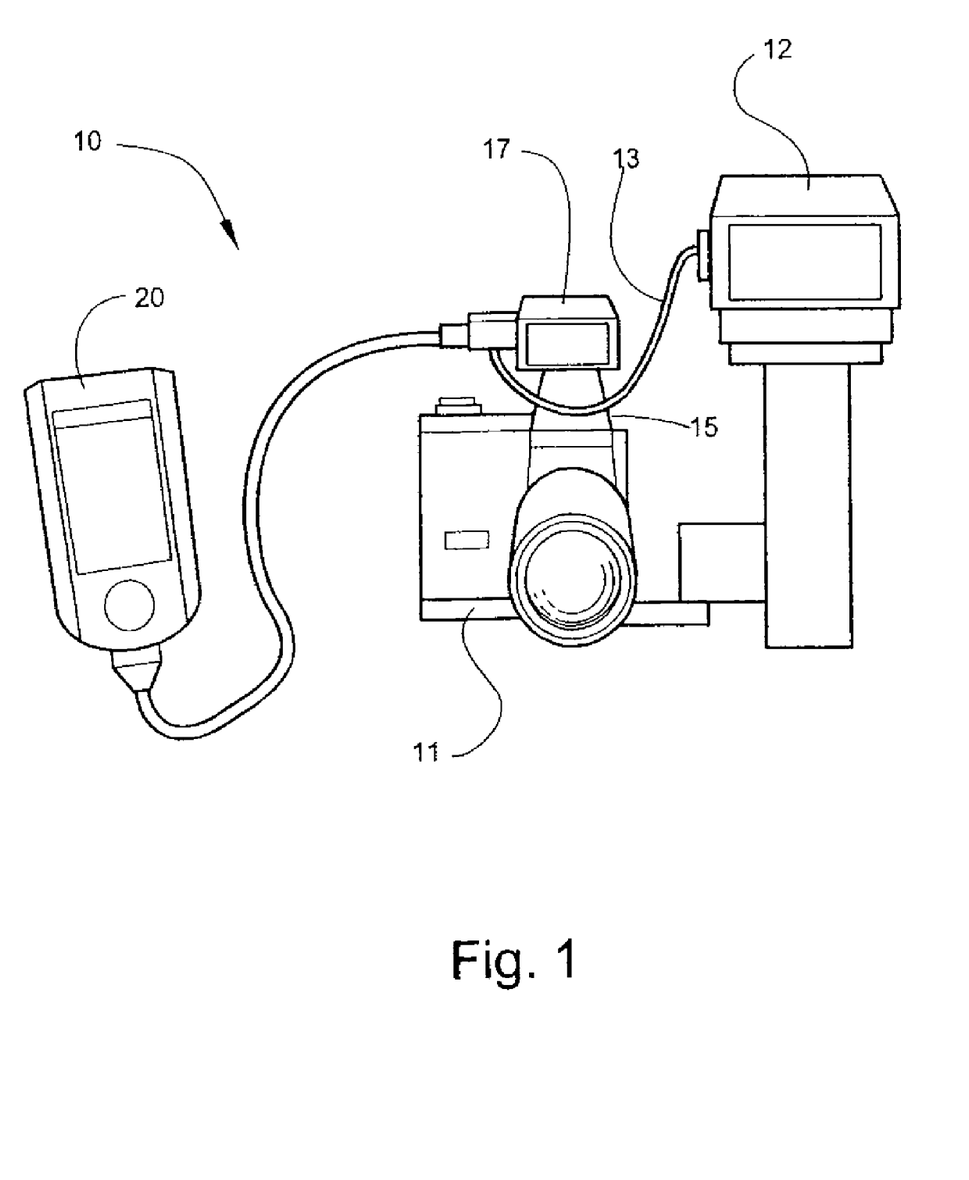
FIG. 1 is a typical configuration of the invention utilizing a PDA.

Referring now specifically to the drawings, one typical preferred configuration according to the present invention is illustrated in FIG. 1 and shown generally at reference numeral 10.

When a photographic image is acquired by a digital (or film) camera 11, a flash circuit is closed. The closing of this circuit is used to either fire an internal flash built into the camera, or to trigger an external flash 12 via either a cord 13 plugged into a PC connector built into the camera 11, or a standard mounting shoe 15 (hotshoe) located on top of the camera 11. An interface box 17 is provided that monitors the camera flash circuit and sends a signal to an external computing or storage device that the camera's flash circuit has been triggered.

The apparatus 10 can operate in one of three ways to sense this event:

1) By plugging the interface box 17 into the PC connector built into most prosumer and professional digital cameras. The interface box 17 plugs into the camera 11 and the flash unit 12 is plugged into an identical connector on the interface box 17, thus effectively placing the interface box 17 inline between the camera 11 and the flash 12.

2) By mounting the interface box 17 on the universal hotshoe 15 located on the top of most cameras, as shown in FIG. 1. If the external flash 12 is used in this situation, it is either plugged into a PC connector in the interface box 17 (most common) or it can be mounted on a second hotshoe built into the interface box 17.

3) By sensing the firing of a flash, using commercially available sensors that are normally used to fire secondary "slave" flash units when the camera flash unit 12 is fired. This approach does not require that the interface box 17 be physically connected to the camera 11, and would normally only be used to synchronize the camera 11 with a PDA 20 before using the PDA 20 in an "untethered" mode, described below.

In methods 1 or 2 the use of a flash, either external or internal in the camera 11, is not required for the system to work. The interface box 17 simply uses the "event" of the flash circuit being closed to notify the PDA 20 that a photo was taken.

The event of the image being acquired by the camera 11 is recorded by the PDA 20 in sequential order with any other data input into the PDA 20, usually by scanning one or more barcodes using commercially available barcode scanners that interface with or are built into various models of PDA's (Compaq iPAQ, HP Jornada, Palm Pilots, etc.). In simplest terms, the sequential recording of events would appear as:

Image 1 acquired; Barcode 1 scanned; Image 2 acquired, Barcode 2 scanned; Barcode 3 scanned; Image 3 acquired; Image 4 acquired; Image 5 acquired; Barcode; 4 scanned, and so on.

One typical manner of usage is inputting of data into the PDA 20 by scanning a barcode on a form filled out by the customer. There are many other ways the data can be acquired by the PDA 20. A portable keyboard (not shown) can be used. The keyboard can either be sitting on a table or counter or worn on the photographer's wrist or arm. Also, data can be input directly into the PDA 20 using its "soft keyboard" or built in handwriting recognition in the same method that people type their notes, phone lists, appointments, etc., although these methods are slower and more cumbersome than quickly scanning a barcode.

Also, the PDA 20 can be adapted to print out sequentially numbered receipts on a printer worn on the photographer's belt, in a manner similar to those used at rental car check-in locations.

The goal of all of these processes is to create a link between the customer(s) in the photograph(s) and the photographs they might be interested in viewing and/or purchasing. This is usually done by linking the photograph to a customer number or a group of customer numbers. These numbers are then associated with customer data, whether on a card, form, or envelope filled out by the customer, or a number that is given to the customer to use in accessing their photos on a website or self-service kiosk at an amusement park or on a cruise ship.

The approach used by some other "tethered" systems (in which a cord keeps the camera and PDA constantly connected) is to download the actual image file into a computer.

As discussed above, this is cumbersome, slow, and expensive. The present approach is different in that the image file is left in the camera.

Another aspect of the invention involves the recording the orientation of the camera 11 by the PDA 20 as each image is required. When photographs are displayed on a website or computer, and when prints are produced if they have a title or logo on them, it is important to have them appear right side up as they were actually photographed. Currently, digital photographers have to review the photos and select the ones that were taken in a vertical vs. horizontal position. Since standard print sizes (8×10, 5×7, 4×6, etc.) are not square, most film cameras and almost all digital cameras capture an image that is wider than taller (landscape vs. portrait in computer terminology). Approximately one-half or more of the photographs taken by event photographers have to be rotated by someone using a software program to tag the images that need to be rotated for correct viewing and printing. This requires an extra step, and the required operator intervention is an obstacle to streamlining or completely automating the uploading and/or printing of the photographs.

Tethered Mode of Operation

Figure 2:
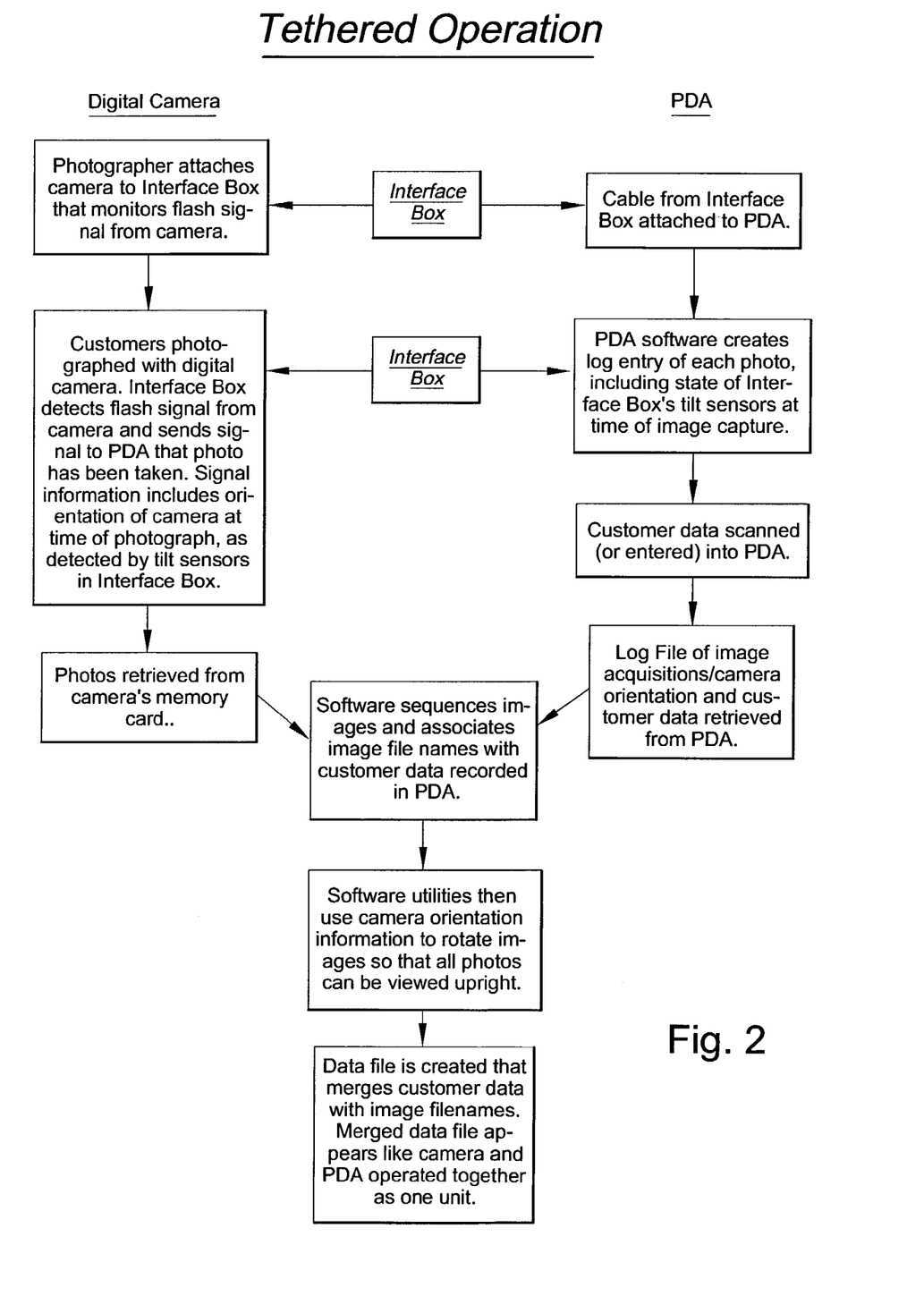
FIG. 2 is a flow diagram of the invention using a tethered operation using a PDA.

Referring now to FIG. 2, when operated in tethered (constantly connected to the PDA 20) mode, the interface box 17 uses two internal tilt sensors to detect what position the camera is in at the moment the image is acquired. Two data bits are sent to the PDA 20 indicating the state of the two tilt sensors at the moment the image is acquired by the camera 11. If neither sensor is activated, the camera 11 is in the normal horizontal (landscape) position. If sensor #1 is activated, the left side of the camera 11 is up at the time the photo is taken, and the image needs to be rotated 90 degrees counter-clockwise before viewing or applying a logo or title within the image. If sensor #2 is activated, the right side of the camera 11 is on top and the image needs to be rotated 90 degrees clockwise. If both sensors are activated, the camera 11 is upside down and the image needs to be rotated 180 degrees, although it is unlikely that this situation will occur.

Non-Tethered Mode of Operation

Figure 3:
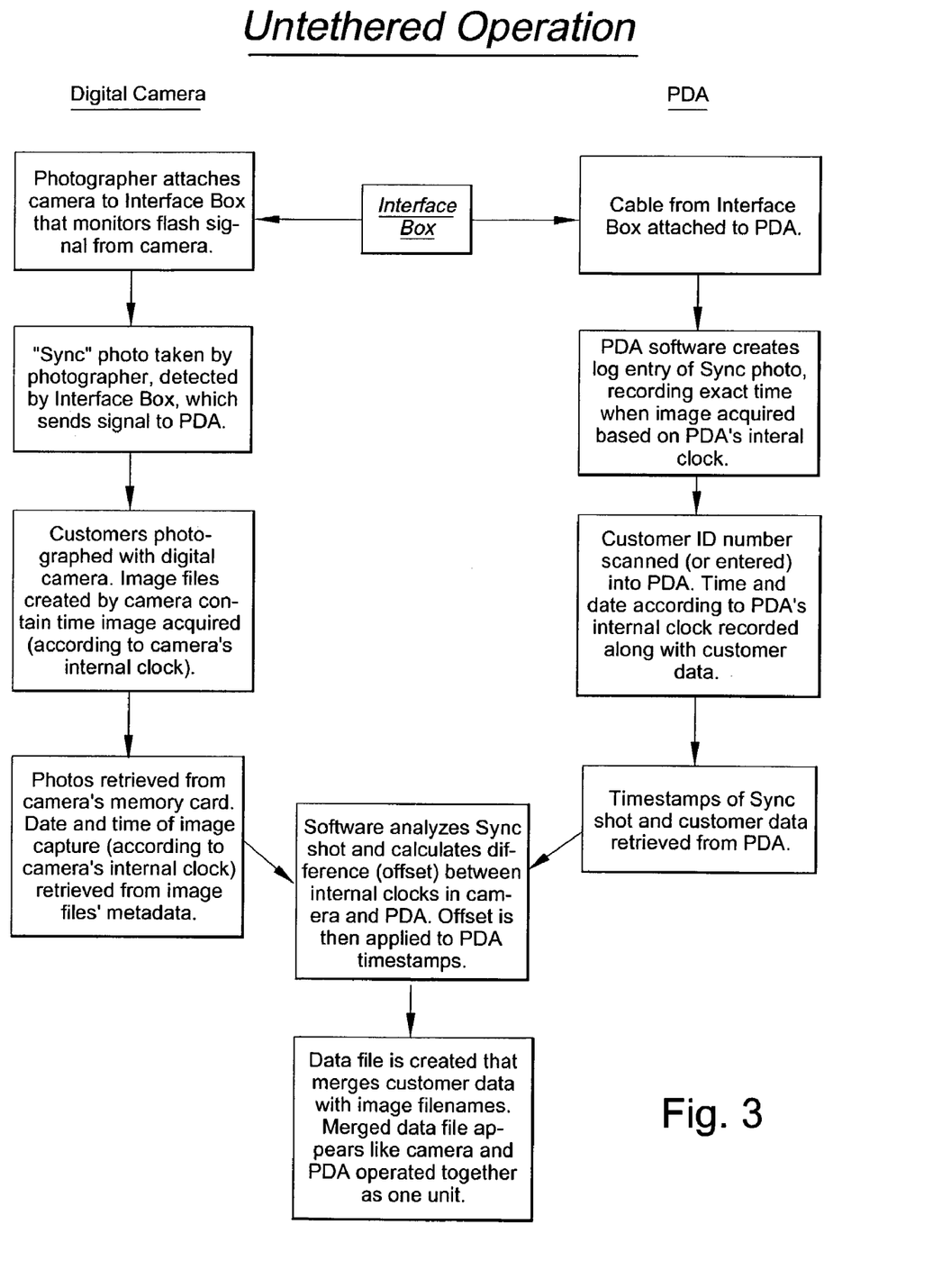
FIG. 3 is a flow diagram of the invention using an untethered operation using a PDA.
Figure 4:
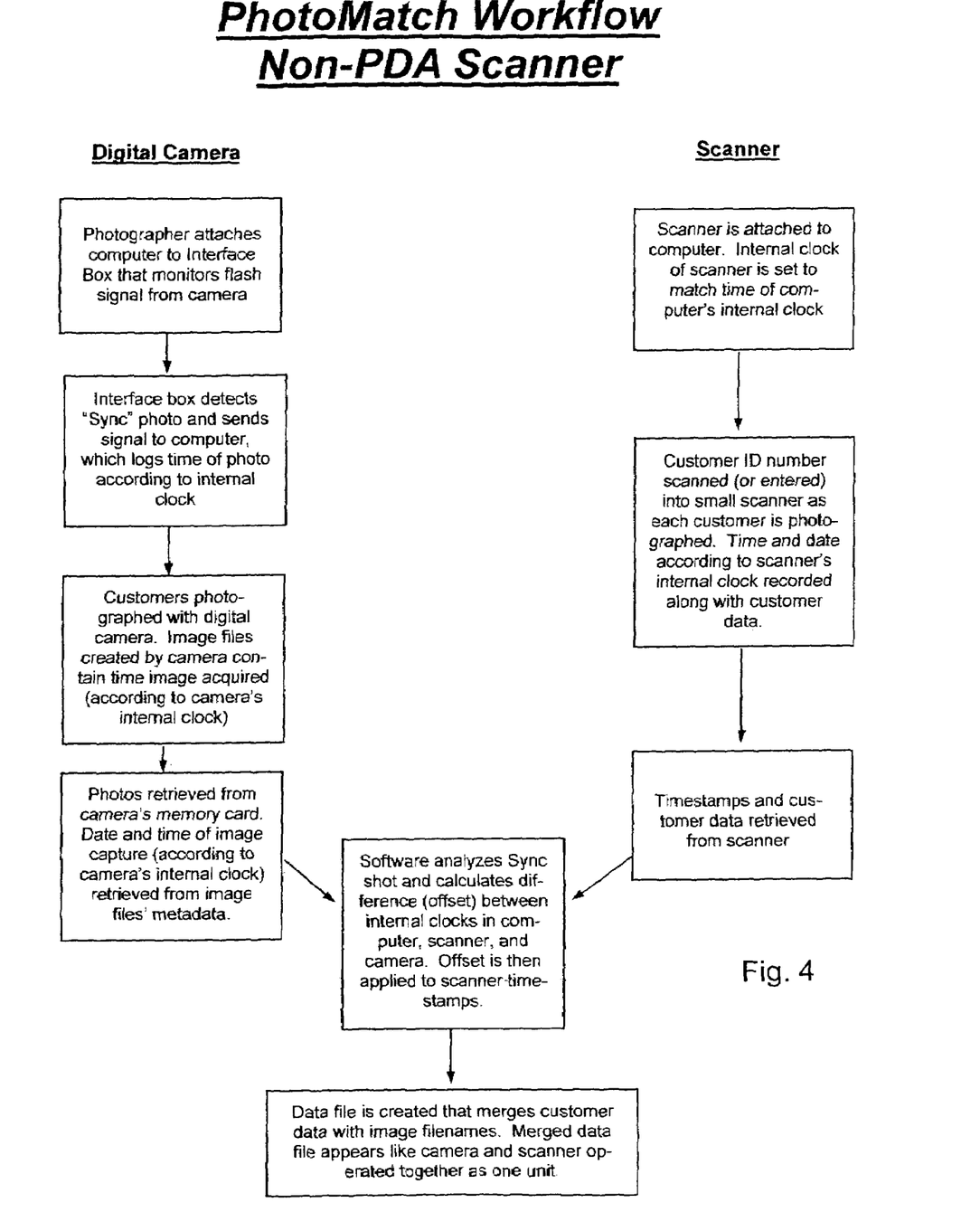
FIG. 4 is a flow diagram of the invention using a digital camera, scanner and computer.

In addition to the tethered method that requires that the camera be constantly "tethered" to the PDA via an interface box and cable, the system can also be used in a non-tethered mode, as described in FIG. 3.

This use does not allow the PDA to capture the orientation of the camera at the time the image was acquired but is less cumbersome since there is no cord connecting the PDA and the camera. The photographer is less encumbered and more mobile.

The non-tethered mode of operation is possible because every image acquired by a digital camera is imprinted with a time and date stamp of the exact date, hour, minute, and second the photo is acquired according to the current time on the camera's internal clock. If all of the camera's and PDA's clocks are synchronized to the exact same second and did not drift over time (which they actually do), then it would not be necessary to synchronize them with the interface box. The photos and barcode scans (also time and date-stamped by the PDA) could be sequenced by computer software that merges the data. Since every camera's and PDA's internal clock run independently of each other and can drift by several seconds during a 24 hour period, it is necessary to synchronize the two clocks before or after a particular camera and PDA combination are used. Otherwise, unless the two are constantly tethered to each other it would be impossible to match the images with the correct customer data. This is especially true in fast-paced events, such as school graduations where hundreds of individual graduates are photographed receiving diplomas two or three seconds apart. A synchronization error of only a few seconds could potentially result in hundreds of people receiving the wrong photograph.

In the non-tethered mode, the photographer typically synchronizes the camera and PDA device by connecting them via the interface box and taking a "sync shot" before the start of the photo shoot. At that point, the camera and PDA are disconnected and the interface box is removed. The PDA is used to scan preprinted cards or envelopes with unique barcode numbers, and the time and date of each scan is recorded-but not the image acquisition since the camera and PDA are no longer connected.

After the photo shoot, the images from the camera's memory card are downloaded from the camera in the conventional manner—usually by copying them from the memory card onto a computer's disk drive. Each data file, usually captured in jpeg image format, contains metadata that is embedded in the image file in a standard format, and specifies information specific to that image, including the exact hour, minute, and second the image was captured.

Once the "sync shot" is located by the operator using the system software, the date and time recorded in that image file's metadata is compared to the date and time recorded by the PDA when the interface box notified the PDA that the synchronization photograph had been taken. The difference between the two times, or "offset", is then applied to all the data captured by the PDA—thus making it appear that the two camera and PDA's clocks were set on exactly the same date, hour, minute, and second. This approach works equally well if the two devices are off by several years or just a few seconds.

The metadata from each image is extracted via commercially available software before activating the system software after the shoot.

Various options can be offered to the viewer for purchasing photographs being viewed using the data transmitted to the PDA.

Wireless image and/or signal transfer can also be accomplished from a cell phone PDA with transmitting card installed. One application platform that may be used is the Bluetooth® wireless specification. This specification provides link layer and application layer definitions supporting data, voice and content-centric applications. Radios operate in the unlicensed 2.4 GHz radio spectrum utilizing a spread spectrum, frequency hopping, full-duplex signal at up to 1600 hops/sec. The signal hops among 79 frequencies at 1 MHz intervals to give a high degree of interference immunity. The Bluetooth® specification is located at http://www.bluetooth.com/dev/specifications.asp.

Tethered Camera/Scanner/Computer Mode of Operation

The Tethered Camera/Scanner/Computer Mode of Operation takes the human out of the equation and allows hardware to perform the synchronization in much the same manner as with the tethered and non-tethered PDA embodiments disclosed above. The camera is synchronized to the barcode reader by either reading and measuring the difference between the clocks on the camera and barcode reader, or where possible by resetting the clocks on both devices to match the host computer's time clock.

A simple utility program resets the internal clock on the barcode device, for example, an inexpensive keychain scanner, to match the host computer when the scanner is "docked" and downloads its data. A barcode reader suitable for use is at: http://www.symbol.com/products/consumer_systems/ consumer_cs1504.html Because a scanner is used, the photographer can hold it and point it at the barcode from a distance of about 6-12 inches. OzE's device (http://www.dpilab.com/accumulator.shtml) is a wand, which means that the lens must be rubbed across the barcode in order to read it. Experience in shooting events and scanning barcodes indicates that the wand devices are more cumbersome and time-consuming to operate when holding an expensive camera and need one hand to hold the barcode card (or envelope) and another one to operate the wand. When scanning a card, it can be held with the same hand as the camera. This is more difficult to do when wanding a card, as the card must be flat and a smooth wanding motion must be used or the barcode will not be read.

Next, the camera's clock must be synchronized with the host computer. In many, but not all, cases it is possible to dock the camera to the host computer (or eventually a PDA) and use software to reset the camera's clock to match the host computer's date and time. This must be done on a regular basis, usually before issuing equipment to the photographer for an assignment, as the clocks in the cameras, barcode scanners, and even computers will drift over time. This drifting is reduced if they are synchronized just before and/or after a shoot. Any drift on the host computer can be eliminated by using commercially available GPS devices that set the computer's or PDA's clock to Greenwich Mean Time to within hundredths of a second.

Even if the host computer is not synchronized to GMT, having all of the devices set electronically to match each other's times will be far more accurate and less error-prone than depending on the photographer to do two actions at once time after time without a mistake.

The manufacturer of Nikon cameras produces software to manually match the time between Nikon D-series SLR digital cameras and the computer they are attached to. In accordance with this invention, this is done automatically, and this should be possible with many other digital cameras, depending on what software functions are made available by the manufacturers for use by custom applications.

In these situations, the host computer (or host PDA), barcode scanner, and camera all operate as one device just as if they were connected. Images and barcode data can all be merged together without adjusting the timestamps because all the clocks are on virtually identical times. This eliminates the need for a "synch" shot that the tethered and non-tethered systems, as well as the OzE system, uses to measure the offset between the two devices so that this offset can be used to adjust the timestamps to achieve the effect of a single, synchronized unit with matching clocks and timestamps.

However, there will still be some cameras, especially lower-end consumer cameras used by some event photographers, that will not be able to dock and synchronize their clocks. Even in this situation, a keychain barcode scanner can still be set to the computer clock so all that is necessary is to measure the difference between the camera's clock and the host computer.

This is accomplished using the same interface box already developed for the tethered and non-tethered systems described above, but since the barcode scanners can be synchronized to a central host computer, the interface box is connected to the serial (COM) port of the host computer, and software monitors for a signal that the flash on the camera has been fired and records the exact time at that moment. Later, when the metadata from this "synch" shot is downloaded and examined, the difference between the camera's timeclock and the host computer can be calculated.

By using a "docking and synching" approach to resetting all the devices, it is not necessary to match a specific barcode reader to a specific camera. Since the barcode scanner will always be reset to match the host computer, regardless of whether the camera is reset or the difference is merely measured, any barcode scanner can be used with any camera without having to match them up before a shoot.

Another application of this approach is with regard to a timed event, such as a marathon, where photos taken at the finish line by multiple photographers could be merged together and indexed according to the race clock at the finish line so that runners (or participants in other types of races) could find their photos by entering in their finish time.

A digital camera/computer or PDA synchronization apparatus and method is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

We claim:

1. A method for matching a photographic image created with a digital camera that includes an internal clock with related identifying data, comprising the steps of:

(a) connecting an interface apparatus to a PC connector or a universal hot shoe of the digital camera;

(b) connecting the interface apparatus to a digital storage device having an internal clock;

(c) creating a digital image with the digital camera that includes a datafile containing image time data based on the internal clock of the camera, said camera including a flash circuit that automatically closes when an image is taken with said camera;

(d) transmitting a signal to the digital storage device through the interface apparatus in response to closure of the flash circuit when the digital image is created;

(e) applying a time stamp to the signal at the digital storage device based on the internal clock of said digital storage device;

(f) storing in the digital storage device identifying information relevant to the digital image, said digital storage device associating information time data according to the internal clock of said digital storage device with said identifying information;

(g) synchronizing the image time data and the information time data; and (h) associating the digital image with the identifying information by matching the synchronized image time data and the information time data.

2. A method for matching a photographic image according to claim 1, wherein the digital storage device is a personal digital assistant.

3. A method for matching a photographic image according to claim 1, wherein the digital storage device is a computer.

4. A method for matching a photographic image according to claim 1, and including the step of storing the identifying information in the digital storage device by scanning indicia from a source external to the digital storage device.

5. A method for matching a photographic image according to claim 4, wherein the source of identifying information is a bar code.

6. A method for matching a photographic image according to claim (1), wherein the step of storing the identifying information comprises the step of entering the data by means of a keyboard connected to the digital storage device.

7. A method for matching a photographic image according to claim 1 wherein said interface apparatus includes tilt sensors for sensing whether the digital image is taken in a landscape orientation or a portrait orientation, and said method further includes the steps of:

defining either the landscape orientation or the portrait orientation as an upright viewing orientation;

sensing whether the digital image is taken in a landscape or portrait orientation;

if the digital image is not in the predefined upright viewing orientation, rotating the digital image into the upright viewing orientation; and providing the digital image in the upright viewing orientation for viewing.

8. A method for matching a photographic image according to claim 1, wherein the step of synchronizing the image time data and the information time data comprises resetting the information time data to match the image time data.

9. The method of claim 2 wherein a bar code scanner is interfaced with or built into said personal digital assistant and used to scan a bar code corresponding to identifying information relevant to said digital image.

10. The method of claim 1 wherein:

a plurality of digital images are created and identifying information relevant to each digital image is stored in said digital storage device; and the signal transmitted to the digital storage device in response to closure of the flash circuit and the corresponding time stamp with respect to each image, and the identifying information relevant to the corresponding image and associated time data, are recorded by the digital storage device in sequential order.

11. The method of claim 1 wherein said digital camera is a digital still camera.

12. A method of matching a photographic image created with a digital camera that includes an internal clock with related identifying data, comprising the steps of:

(a) connecting an interface apparatus to a PC connector or a universal hot shoe of said digital camera;

(b) connecting said interface apparatus to a computer having an internal clock;

(c) while said interface apparatus is connected to said digital camera and said computer, creating a sync digital image with said digital camera that includes a data file containing image time data based on the internal clock of said camera, said camera including a flash circuit that automatically closes when an image is taken with said camera;

(d) transmitting a signal to said computer through said interface apparatus in response to closure of said flash circuit when said sync digital image is created and recording the time said sync digital image was created according the internal clock of said computer in said computer;

(e) importing said image time data associated with said sync digital image into said computer and recording the time that said sync digital image was created according to the internal clock of said camera in said computer;

(f) attaching a digital storage device having an internal clock to said computer and recording the time shown by said internal clock of said digital storage device in said computer;

(g) using said computer to calculate any offset between the internal clocks of said camera, computer and digital storage device;

(h) creating a customer digital image at an event, said customer digital image capturing a specific person at the event and including a data file containing image time data based on the internal clock of said camera;

(i) inputting and storing identifying information tied to said specific person or said customer digital image into said digital storage device, said digital storage device associating information time data according the internal clock of said digital storage device with said identifying information;

(j) importing said customer digital image including said associated data file containing image time data based on the internal clock of said camera from said camera into said computer;

(k) importing said identifying information tied to said specific person or said customer digital image and said associated information time data according to the internal clock of said digital storage device from said digital storage device into said computer;

(l) using said computer to apply any offset to said information time data and synchronize said information time data with said image time data associated with said customer digital image; and (m) associating said customer digital image with said identifying information by matching the synchronized information time data and image time data.

13. The method of claim 12 wherein step (f) further comprises setting the time shown by said internal clock of said digital storage device to match the time shown by the internal clock of said computer.

14. The method of claim 12 wherein said digital camera is a digital still camera.

15. The method of claim 12 wherein said interface apparatus is connected to said PC connector of said digital camera.

16. The method of claim 12 wherein said digital storage device is a scanner.

17. The method of claim 16 wherein said scanner is a barcode scanner, and said identifying information is in barcode form.

18. The method of claim 12, further comprising the steps of prior to creating a customer digital image at said event and using said scanner to scan identifying information tied to said specific person or said customer digital image, disconnecting said camera from said interface apparatus and disconnecting said scanner from said computer.

19. A method of matching a photographic image created with a digital camera that includes an internal clock with related identifying data, comprising the steps of:
(a) connecting an interface apparatus to a PC connector or a universal hot shoe of said digital camera;
(b) connecting said interface apparatus to a computer having an internal clock;
(c) while said interface apparatus is connected to said digital camera and said computer, creating a sync digital image with said digital camera that includes a data file containing image time data based on the internal clock of said camera, said camera including a flash circuit that automatically closes when an image is taken with said camera;
(d) transmitting a signal to said computer through said interface apparatus in response to closure of said flash circuit when said sync digital image is created and recording the time said sync digital image was created according the internal clock of said computer in said computer;
(e) importing said image time data associated with said sync digital image into said computer and recording the time that said sync digital image was created according to the internal clock of said camera in said computer;
(f) attaching a scanner having an internal clock to said computer and setting the time shown by said internal clock of said scanner to match the time shown by the internal clock of said computer;
(g) using said computer to calculate any offset between the internal clock of said camera and the internal clocks of said computer and scanner;
(h) creating a customer digital image at an event, said customer digital image capturing a specific person at the event and including a data file containing image time data based on the internal clock of said camera;
(i) using said scanner to scan identifying information tied to said specific person or said customer digital image, said scanner associating information time data according the internal clock of said scanner with said identifying information;
(j) importing said customer digital image including said associated data file containing image time data based on the internal clock of said camera from said camera into said computer;
(k) importing said identifying information tied to said specific person or said customer digital image and said associated information time data according to the internal clock of said scanner from said scanner into said computer;
(l) using said computer to apply any offset to said information time data based on the internal clock of said scanner and synchronize said information time data with said image time data based on the internal clock of said camera and associated with said customer digital image; and
(m) associating said customer digital image with said identifying information by matching the synchronized information time data and image time data.

20. The method of claim 19 wherein said digital camera is a digital still camera.

21. The method of claim 19 wherein said interface apparatus is connected to said PC connector of said digital camera.

22. The method of claim 19 wherein said scanner is a barcode scanner, and said identifying information is in barcode form.

23. The method of claim 19, further comprising the steps of prior to creating a customer digital image at said event and using said scanner to scan identifying information tied to said specific person or said customer digital image, disconnecting said camera from said interface apparatus and disconnecting said scanner from said computer.

* * * * *